(12) United States Patent
Loh et al.

(10) Patent No.: US 11,958,084 B2
(45) Date of Patent: Apr. 16, 2024

(54) SYSTEM AND METHOD FOR CLEANING AN ANALYZER PROBE

(71) Applicant: Instrumentation Laboratory Company, Bedford, MA (US)

(72) Inventors: Jo-Ann Loh, Bedford, MA (US); Joshua Shreve, Bedford, MA (US); Chison Liu, Bedford, MA (US)

(73) Assignee: INSTRUMENTATION LABORATORY COMPANY, Bedford, MA (US)

( * ) Notice: Subject to any disclaimer, the term of this patent is extended or adjusted under 35 U.S.C. 154(b) by 112 days.

(21) Appl. No.: 17/390,343

(22) Filed: Jul. 30, 2021

(65) Prior Publication Data

US 2023/0033049 A1 Feb. 2, 2023

(51) Int. Cl.
*B08B 3/02* (2006.01)
*B08B 5/02* (2006.01)
*G01N 35/10* (2006.01)

(52) U.S. Cl.
CPC ............... *B08B 3/02* (2013.01); *B08B 5/02* (2013.01); *G01N 35/1004* (2013.01)

(58) Field of Classification Search
CPC ................................................. G01N 35/1004
See application file for complete search history.

(56) References Cited

U.S. PATENT DOCUMENTS

| 4,495,149 A | 1/1985 | Iwata et al. |
| 10,670,619 B2 | 6/2020 | Schulze et al. |
| 2012/0227771 A1* | 9/2012 | Waterbury ......... G01N 35/1004 15/322 |
| 2016/0313361 A1 | 10/2016 | Onoki et al. |
| 2017/0021810 A1* | 1/2017 | Trebouet ................... B60S 1/62 |
| 2019/0041414 A1* | 2/2019 | Schulze ................... B01L 13/02 |

FOREIGN PATENT DOCUMENTS

| JP | S62242858 A | 10/1987 |
| JP | 2011078881 A | 4/2011 |
| JP | 2013134142 A | 7/2013 |

OTHER PUBLICATIONS

JP2011078881A translation, Nozzle cleaning unit, Takasu (Year: 2011).*
Extended European Search Report for European Patent Application No. 22186417.6, dated Dec. 2, 2022, (7 pages).

* cited by examiner

*Primary Examiner* — Cristi J Tate-Sims
(74) *Attorney, Agent, or Firm* — Burns & Levinson LLP

(57) ABSTRACT

A cleaning device, and method of using the same, for cleaning a probe. The device includes a body defining an inner chamber. An air intake is connected to at least one air channel through the body, the at least one air channel configured to allow air from the air intake to flow into the inner chamber and towards the inner chamber. A liquid intake is connected to at least one liquid channel through the body, the at least one liquid channel configured to allow liquid from the liquid intake to flow into the inner chamber.

17 Claims, 8 Drawing Sheets

SYSTEM AND METHOD FOR CLEANING AN ANALYZER PROBE

FIELD OF THE TECHNOLOGY

This disclosure relates to cleaning systems and methods, and more particularly to systems and methods for cleaning analyzer probes.

BACKGROUND OF THE TECHNOLOGY

Analyzer systems often use a probe for sample analysis. For example, a probe may be used to extract a sample from a container for testing. Fluid probes are commonly used for accessing and transferring materials. The probe may be cleaned regularly to avoid material contamination and carryover.

SUMMARY OF THE TECHNOLOGY

An example cleaning device is for cleaning a probe. The cleaning device includes a body defining an inner chamber, the body comprising an opening proximate an upper end of the cleaning device, the opening allowing the probe to enter the inner chamber. The cleaning device includes an air intake connected to at least one air channel formed within the body, the at least one air channel being configured to allow air from the air intake to flow into the inner chamber. The cleaning device includes a liquid intake connected to at least one liquid channel formed within the body, the at least one liquid channel being configured to allow liquid from the liquid intake to flow into the inner chamber. The cleaning device may have a waste outlet proximate a lower end of the cleaning device.

The at least one air channel of the cleaning device may be configured such that air flows towards a probe placed in the device at a vertically downward angle towards a tip of the probe. The at least one air channel of the cleaning device may be positioned vertically above the at least one liquid channel. The at least one air channel of the cleaning device may be a single air channel extending around a circumference of the inner chamber. The at least one air channel may be a single air channel and formed by a distance between opposing sidewalls, the distance including a first distance between the opposing sidewalk at a first end of the air channel at the inner chamber. The distance further includes a second distance being at a second end of the air channel at the air intake, the first distance being less than the second distance. The opposing sidewalls of the cleaning device may extend into the inner chamber.

The at least one air channel of the cleaning device may comprise a plurality of separate air channels, each air channel forming a cylindrical tunnel through the body and into the inner chamber. The at least one liquid channel may further comprise a plurality of separate liquid channels, each liquid channel forming a cylindrical tunnel through the body and into the inner chamber. The separate air channels of the cleaning device may be spaced around a circumference of the inner chamber. The separate liquid channels of the cleaning device may be spaced around the circumference of the inner chamber. The example cleaning device may comprise a lower body positioned between the body and the waste outlet, the lower body defining a lower chamber around the axis and a path may be formed between the body and the lower body for air to exit the cleaning device.

An example method is for cleaning a probe using a cleaning device. The method includes placing at least a part of the probe into a chamber of the cleaning device. Air is directed from an air intake and through an air channel of the cleaning device and towards the probe. Liquid is directed from a liquid intake through a plurality of liquid channels of the cleaning device and towards the probe at a position vertically below the air channel.

The probe may be within a piercer and the method may include inserting the probe and piercer through the opening and into the chamber. The method may then include extending the probe from the piercer. The method may then include delivering a first liquid into the probe such that the first liquid passes through the probe and into a waste outlet proximate a lower end of the cleaning device. The method may then include turning on an air system of the cleaning device to pass air through the air intake and the at least one air channel into the inner chamber. The method may then include delivering a second liquid through the liquid intake and the at least one liquid channel into the inner chamber. The method may then include retracting the probe into the piercer. The method may then include lifting the probe to a position just above the air channel and stopping delivery of the first liquid into the probe. The method may then include lifting the probe and piercer out of the cleaning device. Finally, the method may include, after lifting the probe and piercer, turning off the air system and stopping the delivery of the second liquid into the inner chamber.

The example method may include delivering a first liquid into the probe such that the first liquid passes through the probe and into a waste outlet proximate a lower end of the cleaning device. The method may then include turning on an air system of the cleaning device to pass air through the air intake and the at least one air channel into the inner chamber. The method may then include delivering a second liquid through the liquid intake and the at least one liquid channel into the inner chamber. The method may then include stopping delivery of the first liquid into the probe and lifting the probe out of the cleaning device. After lifting the probe, the method may then include turning off the air system and stopping the delivery of the second liquid into the inner chamber.

The example method may include, during the step of passing air through the air intake and the at least one air channel into the inner chamber, passing the air into the inner chamber at a vertically downward angle. During the step of passing air through the air intake and the at least one air channel into the inner chamber, the air may be passed through the at least one air channel in an air stream such that the air stream narrows as it approaches the inner chamber.

The method may include, after placing at least a part of the probe into a chamber of the cleaning device, delivering a first liquid into the probe such that the first liquid passes through the probe and into a waste outlet proximate a lower end of the cleaning device. The method may then include turning on an air system of the cleaning device to pass air through the air intake and the at least one air channel into the inner chamber. The method may then include delivering a second liquid through the liquid intake and the at least one liquid channel into the inner chamber. The method may then include stopping delivery of the first liquid into the probe and turning off the air system. Finally, the method may include stopping the delivery of the second liquid into the inner chamber and lifting the probe out of the cleaning device.

Two or more of the features described in this specification, including this summary section, may be combined to form implementations not specifically described in this specification.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

Figure 2:
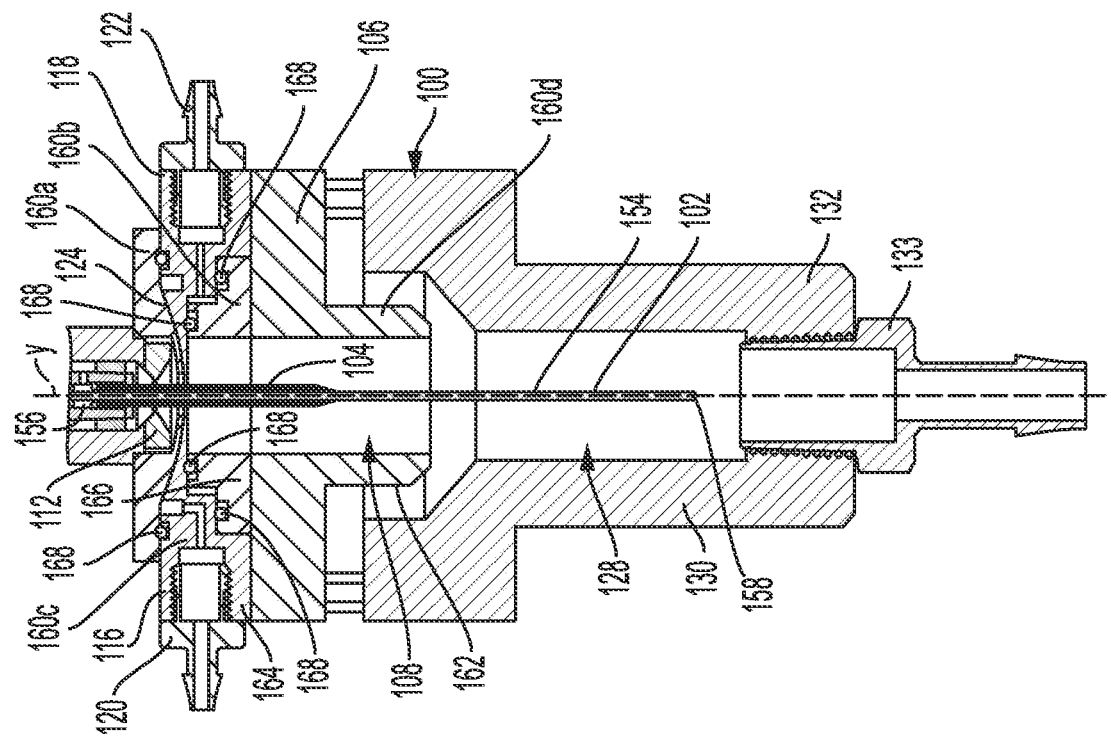
FIG. 2 is a vertical cross sectional view of the cleaning device of FIG. 1.

FIGS. 1-6C show an example implementation of a cleaning device 100 for an analyzer probe 102 (FIG. 2). Notably, in FIGS. 1 and 3-6C, the probe 102 is omitted to more clearly illustrate other features. The cleaning device 100 is configured to clean the analyzer probe 102 after the probe 102 has been used for sampling within an analyzer system. While the probe 102 is described as an analyzer probe 102 by way of example, it should be understood that the probe 102 may be any contact style probe for a fluid or sample handling system. In general, the probe 102 is effective when used within systems which work with any type of sample, including plasma, whole blood, urine, other bodily fluids, a non-biological sample, or others. Cleaning the probe between sampling avoids contamination of subsequently sampled materials by the previously sampled materials. Cross contamination, sometimes called carryover, can ruin on board materials and affect sampling results. Without proper cleaning, contamination can occur when switching to a new sample, and particularly when using analytical materials such as reagents, preparative materials such as diluents, and sample modifiers such as deficient plasmas. The probe 102 can be cleaned either by a rinse (e.g. a water rinse) and dry process, or by chemical cleaning using chemically active cleaning materials. The probe 102 can be dipped or sprayed with the cleaning material. If chemicals are used, a second water rinsing step may be incorporated in the cleaning process to remove the chemical. The rinsing or washing step when not using chemicals will wet the probe and then dry. This can be a passive dip or active spray and is often accompanied by washing of the internal surface of the probe 102.

The example probe 102 shown here is seated within a piercer 104, which can be used to puncture a sample container, although a probe 102 with no piercer 104 may also be used within the cleaning device 100. In general, analyzer systems include robotic systems which can mechanically control the probe 102 to move the probe 102 within the system generally and guide the probe 102 to a location for cleaning.

Figure 1:
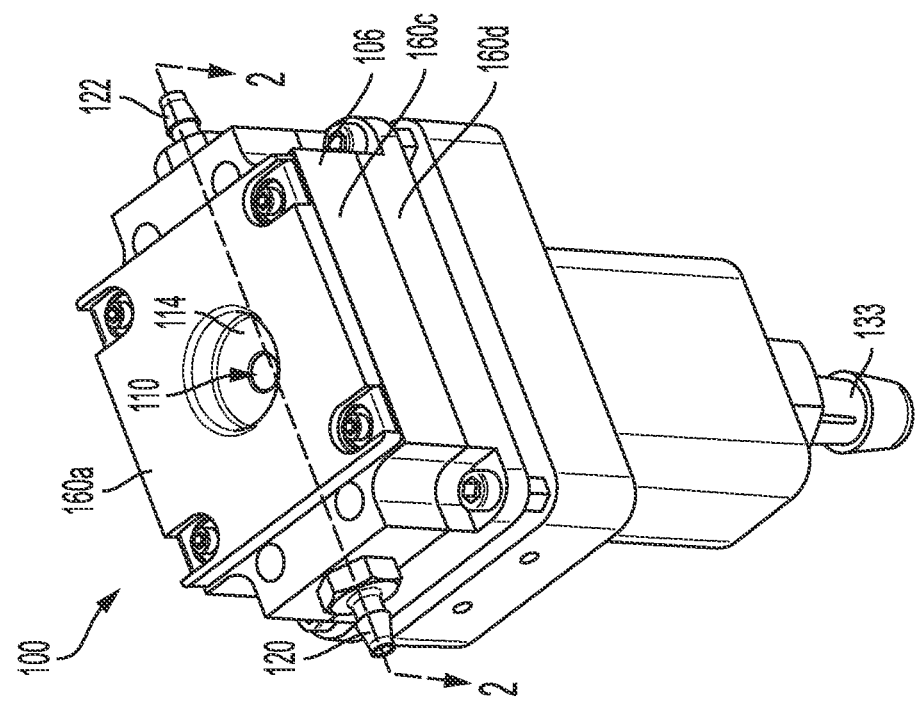
FIG. 1 is a perspective view of an example cleaning device for a probe.

In the example shown in the FIGS. 1-2, the cleaning device 100 includes an upper body 106, which defines a cylindrical inner chamber 108 within which the probe 102 and piercer 104 can be cleaned. An opening 110 is formed within the upper end of the body 106. When the probe 102 is ready to be cleaned, the probe 102 is lowered, by a control system of the cleaning device 100, through the opening 110, into the inner chamber 108 along a central axis "y". As the probe 102 is lowered into the inner chamber 108, a foot 112 of the probe 102 acts as a guide, situating the probe 102 within a seat 114 defined by the top of the body 106 of the cleaning device 100. The seat 114 engages the foot 112 of the probe 102 to assist in holding the probe 102 in place during cleaning. Notably, the probe 102 need not include a foot 112 in all cases.

Liquid and air are delivered into the inner chamber 108 to clean, e.g., rinse off and dry, the probe 102. As such, the device 100 includes an air intake 116 (FIGS. 2, 3, and 5), defined by a solid outer wall around an open interior, which can be in fluid communication with an air system (not shown such as an air pump or pressurized air canister, to receive air through the interior. In some implementations, the outer wall of the air intake 116 is threaded to couple with a threaded nozzle 120 (FIG. 3), by coupling the threads of the air intake 116 and threaded nozzle 120, the threaded nozzle 120 in turn connecting to the air system. Other coupling mechanisms, such as rivets, clips, screws, bolts, etc., can be used to couple the nozzle 120 and intake 116. The cleaning device 100 also includes a liquid intake 118, defined by a solid outer wall around an open interior, which can be in fluid communication with a liquid source (not shown). The liquid source can include deionized water, or another rinsing and/or cleaning agent. Likewise, the liquid intake 118 is threaded to allow for coupling to a threaded nozzle 122, although other couplings, e.g., such as rivets, clips, screws, bolts, etc., can be used, or alternatively, no nozzle 122 can be used and the intake 118 can be connected directly to a liquid source. As shown, the threaded nozzle 122 enables connection of a water line leading to the liquid source. In some implementations, the cleaning liquid and the air can be sent to the intakes 116, 118 using one or more pumps. In other implementations, the cleaning liquid can be sent to the intake 118 via the force of gravity alone.

Figures 3, 4:
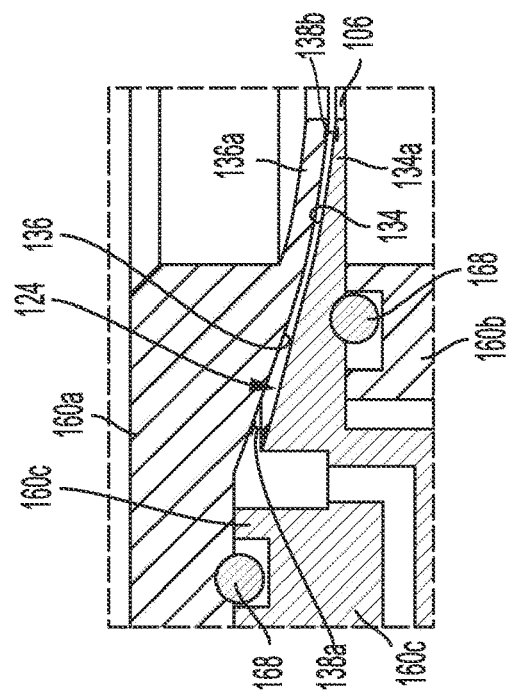
FIG. 3 is a close up view of a portion of the cleaning device of FIG. 2, including arrows representing the path of air through the device.
FIG. 4 is a close up view of a portion of FIG. 3 showing an air channel of the cleaning device.

An air channel 124 provides an opening through the body 106 and into the inner chamber 108 (FIG. 3). As will be discussed in more detail below, the air channel 124 extends around the entire circumference of the probe 102, allowing air from the air intake 116 to flow into the inner chamber 108 and towards the probe 102 such that the air contacts the probe 102 around the entire circumference of the probe 102. One or more liquid channels 126 (FIG. 3) provide an opening (e.g. a tube shaped tunnel) through the body 106 to direct rinse liquid from the liquid intake 118 into the inner chamber 108 and towards the probe 102. The channels 124, 126 can be angled at a vertically downward angle, to direct liquid or air into the inner chamber 108 and towards the probe 102 at a vertically downward angle in accordance with gravity. This allows waste on the probe 102 to be rinsed downward, consistent with the angle of the channels 124, 126, such that the waste passes through a lower chamber 128 of a lower body 130 and into a waste outlet 132. The waste outlet 132 (FIG. 2) is defined by a solid wall forming an opening through which waste can pass. The waste outlet 132 is connected to a waste nozzle 133, e.g., through threads or other mechanisms such as rivets, clips, screws, bolts, etc., for directing waste, e.g., through a waste line, out of the device 100 for capture and disposal. In addition to directing any waste towards the nozzle 133, the lower chamber 128 extends the overall length of the inner chamber 108 such that the probe 102 fits within the device 100.

In the example implementation of FIGS. 1-6C, an air channel 124 extends within the body 106 for directing air. As best seen in FIG. 4, the air channel 124 is formed between sidewalls 134, 136 formed by two separate surfaces of the body 106 separated by a distance 138a, 138b. The height of the air channel 124 (i.e. the distance 138a, 138b between the sidewalls 134, 136) decreases as the air channel 124 approaches the inner chamber 108, forming a narrowing slot. More particularly, the distance 138a is greater at an end of the air channel 124 at the air intake 116, and the distance 138b is less at an end of the air channel near the inner chamber 108. This causes air passing through the air channel 124 to narrow into the shape of a thin curtain (e.g., a sheet or film shape) as the air is directed out of the air channel 124 and into the inner chamber 108 and onto the probe 102. Forming a thin curtain of air may be particularly helpful in drying the probe 102 and directing the rinse liquid and waste downward toward the waste outlet 132, since the narrow curtain results in a greater downward pressure on the waste, as compared to the pressure that would be applied were the air stream not narrowed. Further, to facilitate drying of the entire probe 102, the air channel 124 extends around the entire diameter of the inner chamber 108, providing air from multiple directions, e.g., all around and 360 degrees, around the probe 102. In some implementations, the sidewalk 134, 136 of the air channel 124 extend into (see extended walls 134a, 136a of FIG. 4) the inner chamber 108 and terminate in a narrow circumference 135 around the probe 102 (see e.g. FIG. 5). This can reduce the distance the air is required to travel to reach the probe 102 after leaving the air channel 124. Further, the extended sidewalls 134a, 136a can act a splatter shield, blocking cleaning liquid that splatters off the probe 102 during rinsing from exiting through the opening 110 of the body 106. In other implementations, differently shaped channels and/or additional channels may also be used as an alternative to the channels 124, 126 shown in the cleaning device 100.

Flow arrows 140 in FIG. 3 depict an example path of air through the device 100. As shown, air reaches the intake 116, travels downward through the air channel 124, and contacts the probe 102. The air then passes downwards through the inner chamber 108, towards the lower chamber 128 of the lower body 130. The lower body 130 is connected to the upper body 106 by any mechanical means (e.g. screws) such that a separation distance 142 between the lower and upper bodies 130, 106 is maintained. The separation distance 142 provides a path 144 for the air out of the cleaning device cleaning 100, and prevents pressure from building up within the cleaning device 100 (e.g. from excessive air buildup in the lower chamber 128), which could result in misting and splatter during the cleaning process. To help direct the air 140 along the path 144, the lower body 130 includes interior sidewalls 146 above the lower chamber 128 and the body 106 includes exterior sidewalls 148, which define the path 144, causing the path 144 to initially slope upwards and away from the central axis y before extending directly upwards and parallel to a central vertical axis "y" of the device 100. After extending straight upwards, the path 144 slopes horizontally away from the central axis y of the probe 102. Further, since the path 144 is defined by upwardly sloped walls 146, the path 144 can prevent rinse liquid or waste from exiting the through the path 114.

Figure 5:
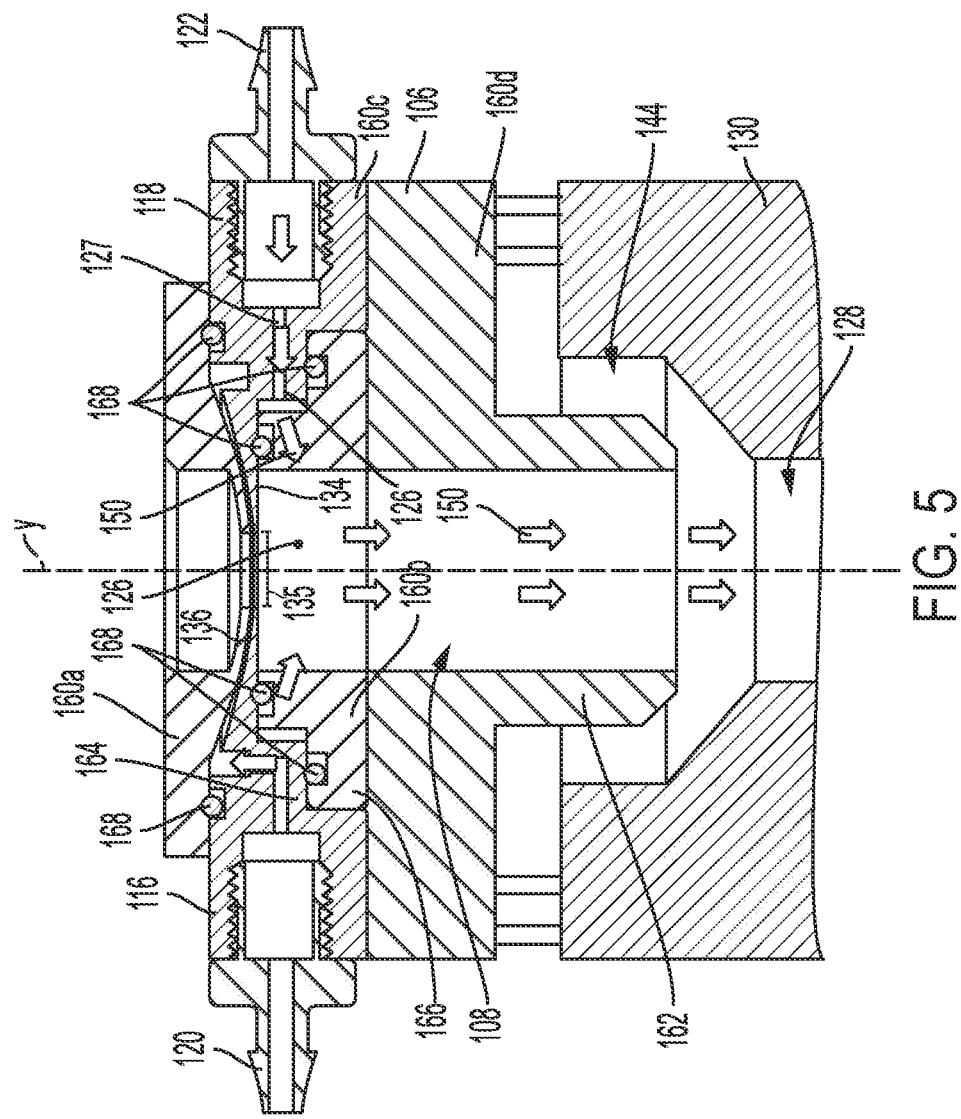
FIG. 5 is a close up view of a portion of the cleaning device of FIG. 2, including arrows representing the path of fluid through the device.
Figure 6A:
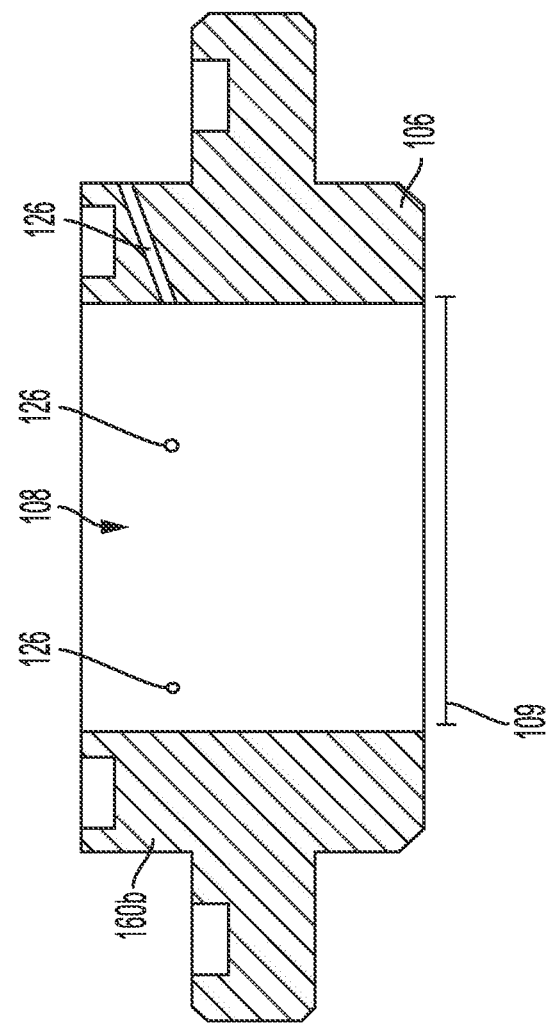
FIG. 6A is a vertical cross section of a segment of the body of the cleaning device of FIG. 1.

Flows arrows 150 in FIG. 5 depict an example path of the rinse liquid through the device 100. A pump and liquid reservoir (not shown herein) provide liquid to the liquid intake 118. From the liquid intake 118, the liquid flows through a number of separate liquid channels 126, which can be cylindrically shaped holes through the body 106, and towards the probe 102. The liquid approaches the probe 102 at a vertically downwards angle (FIG. 6A). The rinse liquid strikes the probe 102 cleaning sample residue off the outer surface of the probe 102. The liquid then passes into the lower chamber 128 and exits the device 100 through the waste outlet 132 (and the nozzle 133, if included). Notably, in FIGS. 3 and 5, the probe 102 is omitted for ease of illustration of the air and water flow 140, 150.

Figure 6C:
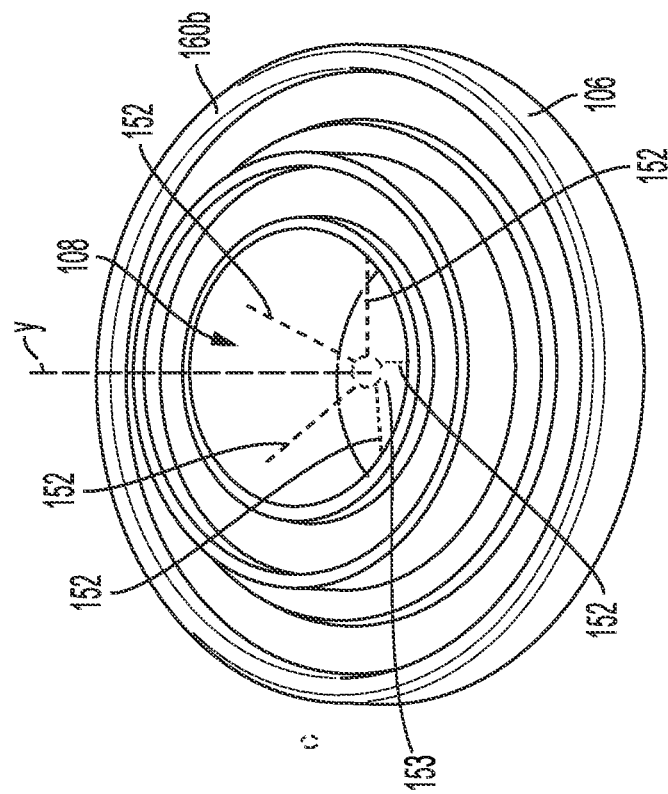
FIG. 6C is a perspective view of the segment of the cleaning device body of FIG. 6A.
Figure 6B:
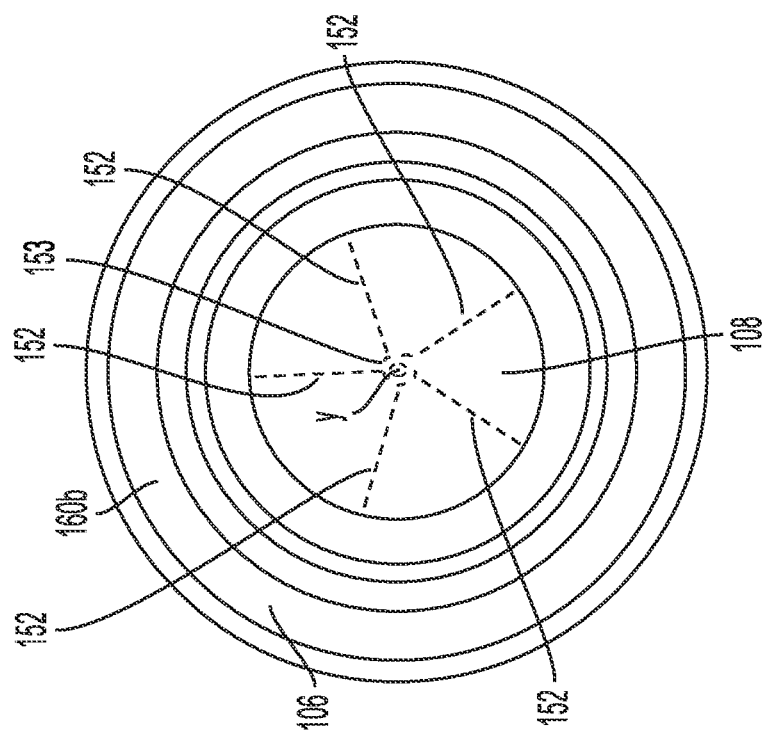
FIG. 6B is an overhead view of the segment of the cleaning device body of FIG. 6A.

Referring to FIGS. 6A-6C, the device 100 may include a plurality (e.g. three, four, five, or another number) of separate liquid channels 126, all individually connected to the liquid intake 118 for delivering liquid from the liquid intake 118 into the inner chamber 108. In FIGS. 6B-C, the example path of cleaning liquid after exiting the channels 126 is shown via liquid 152. The separate liquid channels 126 can be spaced equidistant from one another around the inner circumference 109 (FIG. 6A) of the inner chamber 108 to cause the rinse liquid 152 to strike the probe 102 (omitted for ease of illustration of the rinse liquid 152) at different sides of the probe, helping cleaning of the entire probe 102. While the probe 102 is omitted in FIG. 6A, the liquid 152 is shown as forming a ring 153 at the center where the liquid 152 would normally strike the probe 152 from multiple angles. The channels 126 can be cylindrically shaped, forming separate tunnels to direct jets of liquid 152 at the probe 102. This example arrangement may be effective for cleaning a probe 102 within the cleaning device 100. However, other shapes and orientations of liquid channels 126 may be used, such as cuboidal shaped or triangular shaped channels 126.

Referring again to FIGS. 1-6C, the air channel 124 is positioned above the liquid channels 126 with along the direction of the central axis y. This arrangement can allow the air to contact the probe 102 location(s) above the location(s) where the rinse liquid 152 contacts the probe, moving the liquid 152 downward inside the device 100 and drying the probe 102 as the probe is lifted upwards and out of the inner chamber 108. In this arrangement, the tip 158 of the probe 102 can initially be lowered into the inner chamber 108, with the lower portion 154 of the probe 102 eventually being positioned below the channels 126. The lower portion 154 of the probe 102, below the liquid channels 126 will be rinsed by the liquid 152 during cleaning. In particular, once the probe 102 has been lowered into the chamber 108 (e.g. as shown in FIG. 2), air and rinse liquid 152 can be provided through the channels 124, 126 and the probe 102 can be lifted to rinse and dry the lower area 154 of the probe 102 (and piercer 104 if included). Further, when the probe 102 is within the cleaning device 100, an additional rinse line can be connected through the top end 156 (FIG. 2) of the probe 102 (the probe 102 having a tubular structure) to provide rinse liquid to the interior of the probe 102. The liquid within the interior of the probe 102 can pass through the probe 102, exiting from the tip 158 of the probe 102 and passing to the waste outlet 132. As the probe 102 is lifted, the rinse liquid 152 from the liquid channels 126 comes into direct contact with the entire lower area 154 of the probe 102 to clean the lower area. Similarly, air from the air channel 124 directly contacts the probe 102 as it is lifted, drying the entire lower area 154 of the probe 102 just after it is cleaned with the rinse liquid 152. Therefore, after the probe 102 is seated within the cleaning device 100, the probe 102 can be cleaned with a simple upward movement of the probe 102. This avoids the need for any further manipulation of the probe 102, resulting in a simple cleaning and drying sequence which can be carried out quickly to increase or to maximize throughput of the corresponding analyzer system.

Figure 8:
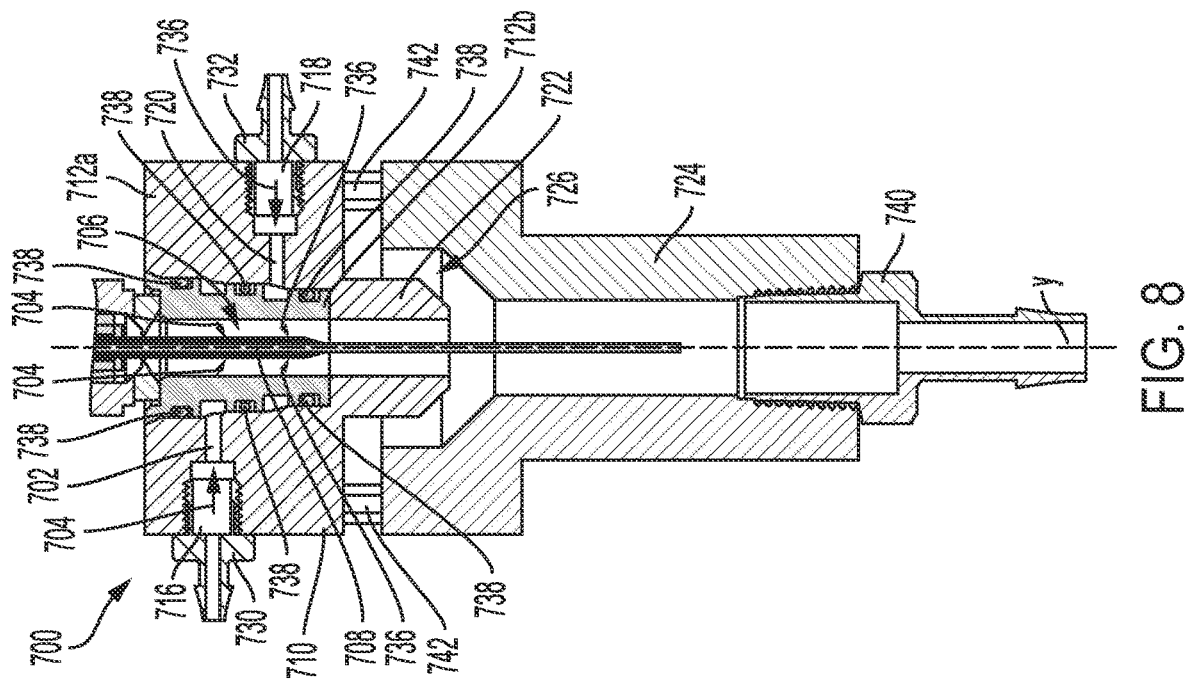
FIG. 8 is a vertical cross sectional view of the cleaning device of FIG. 7.
Figure 7:
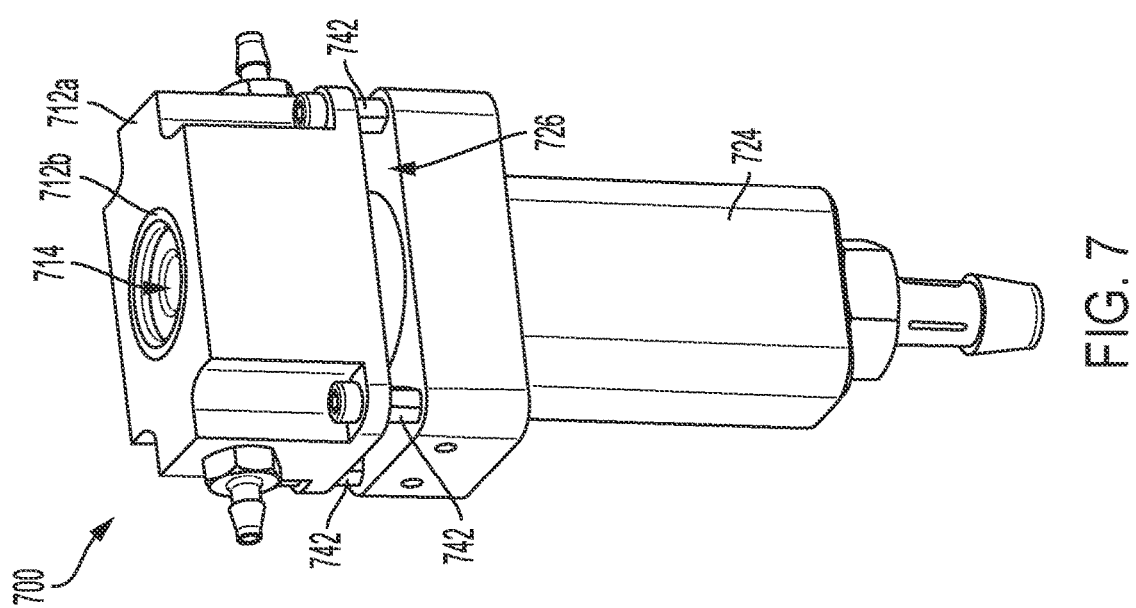
FIG. 7 is a perspective view of another example cleaning device for a probe.

In the example of FIGS. 1-6C, the upper body 106 of the cleaning device may be include members 160a, 160b, 160c, and 160d. The members 160a-160d can be formed separately and connected after formation, or one or more or the entire members can be formed as an integral part. A top member 160a is in the shape of a plate which forms the opening 110 and seat 114 for the probe 102. The air channel 124 is formed between the top member 160a, and a central exterior member 160c. For example, the bottom surface of the top member 160a forms one sidewall 136 of the air channel 124 (FIG. 4). The opposing sidewall 134 of the air channel 124 is part of a surface of a central exterior member 160c (FIG. 4). Additionally, the air intake 116, the liquid intake 118, and a beginning 127 of the liquid channels 126 (FIG. 5) proximate the intake 118 can be formed in the central exterior member 160c. The remainder of each liquid channel 126 is formed in a central interior member 160b that is located between the central exterior member 160c and the inner chamber 108. The central interior member 160b has an open center, defining the top portion of the inner chamber 108. A lower member 160d located adjacent to the members 160b, 160c forms the bottom of the upper body 106. An inner opening within the lower member 160d defines the bottom of the inner chamber 108 leading into the lower body 130. The lower member 160d includes a lower protruding end 162 having an outer diameter 163 smaller than an upper inner diameter 165 of the body 130 (FIG. 3). This allows the lower end 162 to be contained within the lower body 130. The exterior sidewalls 148 of the lower end 162 define one side of the air path 144, and interior sidewalls 146 of the lower body 130 form the opposing side of the air path 144. The central exterior member 160c and central interior member 160b each include a flange 164, 166, which couple to secure the central interior member 160b between the central exterior member 160c and the lower member 160d. O-rings 168 are provided between adjacent members 160a, 160b, 160c to create seals therebetween (FIGS. 2-5), FIGS. 7-8 show another example implementation of a probe cleaning device 700. The device 700 is configured similarly to the device 100 shown in FIGS. 1-6C, except as otherwise shown and described herein. In particularly, the device 700 includes air channels 702 for directing air which are constructed or formed similar to the liquid channels 126 described above. The air channels 702 can include a plurality (e.g. three, four, five, or another number) of separate tunnels, e.g., tube shaped tunnels, which direct air from an air intake 716 into the inner chamber 706 of the device 700, as indicated by air flow arrows 704. The air channels 702 can be spaced, e.g., in equal distance, around the circumference of the inner chamber 706 to dry the probe 708 from different directions. The liquid channels 720 can include a plurality (e.g. three, four, five, or another number) of tunnels which are similarly formed and located, below the air channels 702, to provide liquid (e.g. arrows 736) to the probe 708 for cleaning, as liquid channels 126. Waste liquid exits through the waste nozzle 740, which includes an outer wall defining an opening, similar to waste nozzle 133, while excess air can exit through air path 726 similar to air path 144.

The upper body 710 of the cleaning device 700 includes two members 712a, 712b, separately formed and connected or integrally formed. Exterior member 712a defines the opening 714 for receiving the probe 708, the intakes 716, 718, and parts of the upper and liquid channels 702, 720. Nozzles 730, 732 connect to the intakes 702, 720 to provide air and liquid, respectively. The interior member 712b disperses air 704 and liquid 736 from the channels 702, 720 into the inner chamber 706 to contact the probe 708. A cylindrical opening in the center of the inner member 712b forms the top of the inner chamber 706. The lower portion of the inner chamber 706 is formed by a cylindrical opening in the bottom portion of the exterior member 712a. The top and bottom of the chamber 706 can have the same shape and size, e.g., the same diameter. The bottom portion of the exterior member 712a also forms a protruding lower end 722, which defines sidewalls of the air path 726. The exterior and interior members 712a, 712b can be sealed together with O-rings 738 on either side of both the upper and liquid channels 702, 720. The exterior member 712a can be rigidly connected to the lower body 724 by rods 742 in the air path 726 while keeping the air path open.

Figure 9:
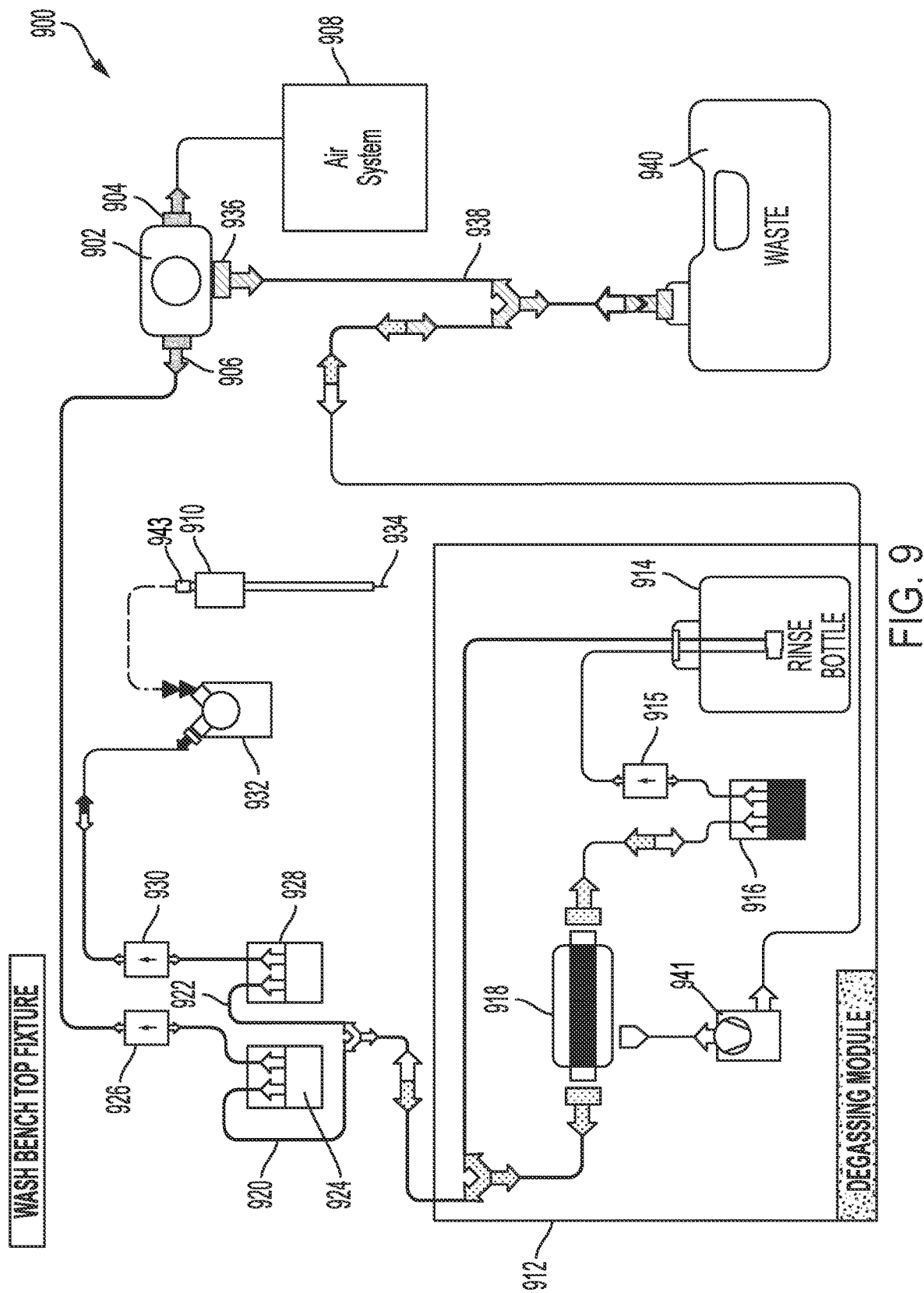
FIG. 9 is a schematic diagram of an example cleaning system that includes a cleaning device for a probe.

FIG. 9 shows an example probe cleaning system 900 for use with the example probe cleaning devices described herein. The system 900 includes a cleaning device 902, which can include one of the cleaning devices 100, 700 shown and described herein. The cleaning device 902 has an air nozzle 904 and liquid nozzle 906 which connect the cleaning device 902 to air and liquid lines, respectively. The air nozzle 904 is fed air by an air system 908, which can include a pump, pressurized air canister, or other device for delivering air via a connected air line. When the air system 908 is turned on, air from the air system 908 passes to the air nozzle 904 and into an air intake of the cleaning device 902 to dry the probe 910 after the probe 910 is lowered into the cleaning device 902.

A degassing module 912 can prepare liquid as cleaning liquid for use within the system 900. Degassing can be used for precision fluids, but it should be understood that degassing, and therefore the degassing module 912, are not required in all circumstances. For example, the degassing module 912 is not needed when the probe 902 is cleaned by rinsing with water. A rinse bottle 914 within the degassing module 912 (or separate, if no degassing module 912 is used) includes a liquid, such as deionized water. A pump 916 transfers liquid from the rinse bottle 914, through a check valve 915 and to a degasser 918 (if included), which allows excess gas to bleed off as the liquid passes through. Some liquid can be circulated back to the rinse bottle 914 to create a holding loop for precision fluidics, if necessary. However, for cleaning with a water rinse, no recirculation back to the rinse bottle 914 is necessary. The liquid is then sufficient for use as a cleaning liquid. When the degasser 918 is used, some additional water evaporates and transfers thought the degassing membrane, being pulled in by the vacuum pump 941 to then be ejected to a waste container 940.

The cleaning liquid exits the degassing module 912 and is split between two separate lines 920, 922. A pump 924 on the first line 920 is operable to direct the cleaning liquid through a check valve 926 and to the liquid nozzle 906 of the cleaning device 902. A pump 928 on the second line 922 is operable to direct cleaning liquid to a syringe pump 932 connected to the probe 910. When the probe 910 is placed within the cleaning device 902, the syringe pump 932 is operable to pump cleaning liquid into the interior of the probe 910 for cleaning. A valve 943 on the probe 910 can be opened to allow cleaning liquid within the interior of the probe 910 to drain through the probe tip 934. After cleaning the probe 910, all cleaning liquid and any waste cleaned off the probe 910 passes to a waste outlet 936 at the bottom of the cleaning device 902. A waste line 938 directs the liquid and waste mixture to the waste container 940 for storage and disposal. It is then ejected from the exit of the vacuum pump and sent to waste.

In general, the cleaning system 900 can remain connected until a probe is ready to be cleaned. Once the probe is ready, the syringe pump 932 can be connected to the probe 910 manually, or automatically via the robotic system of the analyzer. The robotic system of the analyzer can then move the probe 910 for cleaning, as described herein.

Figure 10:
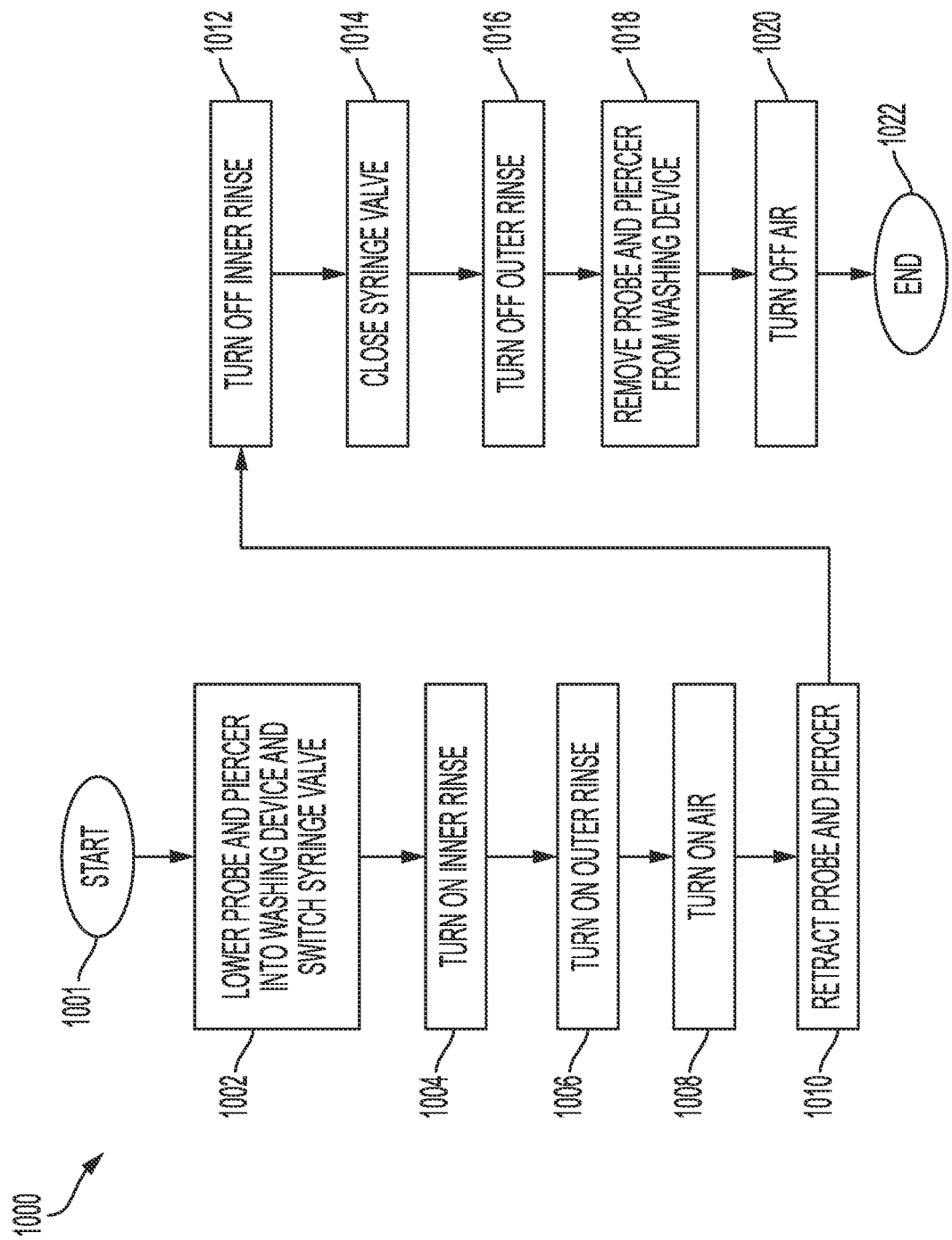
FIG. 10 is a flowchart of a method of using a cleaning device for a probe.

FIG. 10 shows operations included in an example method for cleaning a probe using a cleaning device, such as the cleaning devices 100, 700, 902 described herein. In this example, the method 1000 relates to cleaning a probe that includes a surrounding piercer within a cleaning device. However, it should be understood that probes without piercers may also be cleaned using the systems and methods described herein. In this example, the method starts, at operation 1001, after the probe and piercer have been used for sampling and require cleaning. The probe and piercer (or just probe, if no piercer is included) are then lowered through the upper opening of a cleaning device, at operation 1002. For example, initially, the foot of the probe can be positioned above the top of the cleaning device. A valve on the probe is switched to bypass to allow liquid to flow through the probe (e.g., as shown from valve 943 of FIG. 9). The probe is then lowered further such that the foot of the probe is positioned within the seat of the cleaning device. Alternatively, the bypass valve can be switched on after the probe is lowered. The probe and the piercer are on independent motion axes, allowing each to independently extend from the other for cleaning. Therefore, once the foot is within the seat, the probe is extended from the piercer and into the inner chamber (e.g. inner chamber 108 and lower chamber 128 of FIG. 2, for example).

At operation 1004, an interior rinse is performed. A pump connected to a cleaning liquid reservoir can deliver liquid to the interior of the probe for cleaning (e.g., via bypass valve 943 of FIG. 9). The liquid rinses the interior of the probe, passing through the open bypass valve and into the inner chamber of the cleaning device. Next, an exterior rinse is performed at operation 1006. During the exterior rinse, a cleaning liquid is delivered from a liquid reservoir, e.g., using a pump, to the liquid intake (e.g., intake 118 of FIG. 3) of the cleaning device, through the liquid channels (e.g., liquid channels 126 of FIGS. 5-6C) and to the exterior of the probe and piercer for cleaning. Waste liquid running off the probe can go through the waste outlet 132 (e.g. FIGS. 2-3) to a waste container. In some implementations, the operations 1004 and 1006 can be performed, at least partially, simultaneously or the operation 1006 can be performed before the operation 1004.

At operation 1008, an air system connected to the air intake is then turned on. Various air systems can be used as part of the system. For example, the air system can include an air pump connected to the air intake of the cleaning device which can be turned on to provide air. Alternatively, a transmission line connected between an air source (e.g. a pressurized air canister) and the air intake may include a valve which can be turned to an open position to allow pressured air to flow through the air intake. The air can be turned on while water rinsing is still in progress to rinse and dry simultaneously. Once the air system is turned on, air passes through the air intake (e.g., air intake 116 of FIGS. 2-3) into the air channel (e.g. channel 124 of FIGS. 2-5) of the cleaning device to the exterior of the probe to move the cleaning liquid downwards towards the waste outlet.

At operation 1010, the probe and piercer are then retracted out of the cleaning device and washed during the process of retraction. This can be carried out by first retracting the piercer into the foot. As the piercer is retracted, the lower region of the piercer will come in direct contact with the liquid from the exterior rinse. Further, just after contact with the cleaning liquid, the exterior will be contacted by the air jets or curtains, drying the piercer before the piercer has been completely removed from the cleaning device. The probe can then be lifted to a position just above the air and water channels, cleaning the probe as it is raised. The inner rinse is then turned off, (e.g., by closing bypass valve 943 of FIG. 9), at operation 1012, stopping the delivery of the inner rinse liquid before the probe has been completely removed from the cleaning device. Once the inner rinse is turned off, the syringe bypass valve can then be closed at operation 1014. At operation 1016, the outer rinse is turned off. The probe and piercer are then removed from the cleaning device, at operation 1018, and the air system is turned off at operation 1020. Notably, in some cases, the outer rinse can be turned off (i.e. operation 1016), stopping the delivery of the outer rinse liquid, after removal of the probe and piercer at operation 1018. The probe and piercer have then been effectively cleaned and dried, and the method ends at operation 1022. The total time required to complete a cleaning (i.e. to rinse and dry the probe and piercer, if included) is determined on a case by case basis, depending on the carryover risk of materials. Overall, the method 1000 allows the probe and piercer to be dried quickly by simply lowering the probe and piercer into the cleaning device, and then raising the probe and piercer directly out of the cleaning device, without the need to rotate the probe and piercer or place them in a separate device.

All orientations and arrangements of the components shown herein are used by way of example only. Further, it will be appreciated by those of ordinary skill in the pertinent art that the functions of several elements may, in alternative implementations, be carried out by fewer elements or a single element. Similarly, in some implementations, any functional element may perform fewer, or different, operations than those described with respect to the illustrated implementation. Also, functional elements shown as distinct for purposes of illustration may be incorporated within other functional elements in a particular implementation.

Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always at a higher elevation).

While the subject technology has been described with respect to preferred implementations, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A cleaning device for cleaning a probe, comprising:
a body defining an inner chamber, the body comprising an opening proximate an upper end of the cleaning device, the opening allowing the probe to enter the inner chamber;
an air intake connected to at least one air channel formed within the body, the at least one air channel being configured to allow air from the air intake to flow into the inner chamber and along at least part of the probe toward a lower end of the cleaning device; and
a liquid intake connected to at least one liquid channel formed within the body, the at least one liquid channel being configured to allow liquid from the liquid intake to flow into the inner chamber;
wherein the body comprises a channel defining a flow path between the inner chamber and exterior to the cleaning device through which the air exits the cleaning device, at least part of the channel extending upward relative to the inner chamber toward the upper end of the cleaning device.

2. The cleaning device of claim 1, further comprising a waste outlet proximate a lower end of the cleaning device.

3. The cleaning device of claim 1, wherein the at least one air channel is configured such that air flows towards a probe placed in the cleaning device at a vertically downward angle towards a tip of the probe.

4. The cleaning device of claim 3, wherein the at least one air channel is positioned vertically above the at least one liquid channel.

5. The cleaning device of claim 1, wherein the at least one air channel is a single air channel extending around a circumference of the inner chamber.

6. The cleaning device of claim 1, wherein the at least one air channel is a single air channel and formed by a distance between opposing sidewalls, the distance including a first distance between the opposing sidewalls at a first end of the air channel at the inner chamber, the distance further including a second distance at a second end of the air channel at the air intake, the first distance being less than the second distance.

7. The cleaning device of claim 6, wherein the opposing sidewalls extend into the inner chamber.

8. The cleaning device of claim 4, wherein:
the at least one air channel comprises a plurality of separate air channels, each air channel forming a cylindrical tunnel through the body and into the inner chamber; and
the at least one liquid channel comprises a plurality of separate liquid channels, each liquid channel forming a cylindrical tunnel through the body and into the inner chamber.

9. The cleaning device of claim 8, wherein the separate air channels are spaced around a circumference of the inner chamber.

10. The cleaning device of claim 9, wherein the separate liquid channels are spaced around the circumference of the inner chamber.

11. The cleaning device of claim 2, further comprising a lower body positioned between the body and the waste outlet, the lower body defining a lower chamber around the axis,
wherein, a path is formed between the body and the lower body for air to exit the cleaning device.

12. A method of cleaning a probe using a cleaning device, comprising:
placing at least a part of the probe into an inner chamber of the cleaning device, the inner chamber comprising an opening proximate an upper end of the cleaning device;
directing air from an air intake and through an air channel of the cleaning device and towards the probe, the air being pressurized to flow along at least part of the probe towards a lower end of the cleaning device and through a channel that defines a flow path between the inner chamber and exterior to the cleaning device and that extends at least partly upward relative to the inner chamber toward the upper end of the cleaning device; and
directing a liquid from a liquid intake through a plurality of liquid channels of the cleaning device and towards the probe at a position vertically below the air channel.

13. The method of claim 12, wherein the probe is within a piercer, the method further comprising:
inserting the probe and piercer through the opening and into the inner chamber;
extending the probe from the piercer;
delivering a first liquid into the probe such that the first liquid passes through the probe and into a waste outlet proximate a lower end of the cleaning device;
turning on an air system of the cleaning device to pass air through the air intake and the at least one air channel into the inner chamber;
delivering a second liquid through the liquid intake and the at least one liquid channel into the inner chamber;
retracting the probe into the piercer;
lifting the probe to a position just above the at least one air channel and stopping delivery of the first liquid into the probe;
lifting the probe and piercer out of the cleaning device; and
after lifting the probe and piercer, turning off the air system and stopping the delivery of the second liquid into the inner chamber.

14. The method of claim 12, further comprising;
delivering a first liquid into the probe such that the first liquid passes through the probe and into a waste outlet proximate a lower end of the cleaning device;
turning on an air system of the cleaning device to pass air through the air intake and at least one air channel into the inner chamber;
delivering a second liquid through the liquid intake and the at least one liquid channel into the inner chamber;
stopping delivery of the first liquid into the probe;
lifting the probe out of the cleaning device; and
after lifting the probe, turning off the air system and stopping the delivery of the second liquid into the inner chamber.

15. The method of claim 14, wherein, during the step of passing air through the air intake and the at least one air channel into the inner chamber, the air is passed into the inner chamber at a vertically downward angle.

16. The method of claim 15, wherein, during the step of passing air through the air intake and the at least one air channel into the inner chamber, the air is passed through the at least one air channel in an air stream such that the air stream narrows as it approaches the inner chamber.

17. The method of claim 12, further comprising:
- after placing at least a part of the probe into a chamber of the cleaning device:
- delivering a first liquid into the probe such that the first liquid passes through the probe and into a waste outlet proximate a lower end of the cleaning device;
- turning on an air system of the cleaning device to pass air through the air intake and at least one air channel into the inner chamber;
- delivering a second liquid through the liquid intake and at least one liquid channel into the inner chamber;
- stopping delivery of the first liquid into the probe;
- turning off the air system;
- stopping the delivery of the second liquid into the inner chamber; and
- lifting the probe out of the cleaning device.

* * * * *